(12) United States Patent
Fujii et al.

(10) Patent No.: US 7,768,281 B2
(45) Date of Patent: Aug. 3, 2010

(54) PROBE ASSEMBLY FOR LAPPING A BAR USING A PATTERNED PROBE

(75) Inventors: Ryuji Fujii, Hong Kong (CN); Takashi Honda, Hong Kong (CN); Hiroyasu Tsuchiya, Hong Kong (CN); Koji Hosaka, Hong Kong (CN)

(73) Assignee: SAE Magnetics (H. K.) Ltd., Hong Kong (CN)

( * ) Notice: Subject to any disclaimer, the term of this patent is extended or adjusted under 35 U.S.C. 154(b) by 296 days.

(21) Appl. No.: 12/073,174

(22) Filed: Feb. 29, 2008

(65) Prior Publication Data

US 2008/0223155 A1    Sep. 18, 2008

(30) Foreign Application Priority Data

Mar. 6, 2007   (JP) .............................. 2007-055568

(51) Int. Cl.
*G01R 31/02* (2006.01)
(52) U.S. Cl. ..................................... 324/754; 324/158.1
(58) Field of Classification Search ......... 324/754–765, 324/158.1; 439/482
See application file for complete search history.

(56) References Cited

U.S. PATENT DOCUMENTS

| 5,247,250 | A | * | 9/1993 | Rios ............................ 324/754 |
| 5,914,613 | A | * | 6/1999 | Gleason et al. ............. 324/754 |
| 6,281,691 | B1 | * | 8/2001 | Matsunaga et al. .......... 324/754 |
| 6,713,374 | B2 | * | 3/2004 | Eldridge et al. ............. 438/611 |
| 7,123,036 | B2 | * | 10/2006 | Cram .......................... 324/754 |
| 7,218,131 | B2 | * | 5/2007 | Tanioka et al. .............. 324/762 |
| 7,629,806 | B2 | * | 12/2009 | Hosaka ....................... 324/762 |
| 7,652,972 | B2 | * | 1/2010 | Nam et al. ................... 369/126 |
| 2007/0089551 | A1 | * | 4/2007 | Williams et al. ........... 73/866.5 |
| 2007/0126444 | A1 | * | 6/2007 | Hosaka et al. .............. 324/754 |
| 2007/0170940 | A1 | * | 7/2007 | Chen et al. .................. 324/754 |

FOREIGN PATENT DOCUMENTS

| JP | 2-95572 | 4/1990 |
| JP | 2000-163719 | 6/2000 |

* cited by examiner

*Primary Examiner*—Ha Tran T Nguyen
*Assistant Examiner*—Richard Isla Rodas
(74) *Attorney, Agent, or Firm*—Nixon & Vanderhye P.C.

(57) ABSTRACT

A probe assembly used to lap a bar, the bar being provided with elements that are to be formed into sliders, is provided. The probe assembly comprises an elastically deflectable probe, and a stopper for applying bending deformation to the probe so as to cause first bending deflection at a leading end of the probe and for maintaining the first bending deflection of the leading end while preventing a bending deformation at the leading end from becoming smaller than the first bending deflection. The leading end of the probe is adapted to be subjected to second bending deflection that is larger than the first bending deflection in a same direction as a direction of the first bending deflection and thereby to abut against an electrode pad to establish electrical connection between the probe and the electrode pad, the electrode pad being provided on a surface of the bar other than a surface to be lapped.

14 Claims, 4 Drawing Sheets

PROBE ASSEMBLY FOR LAPPING A BAR USING A PATTERNED PROBE

The present application is based on, and claims priority from, J.P. Application No. 2007-55568, filed on Mar. 6, 2007, the disclosure of which is hereby incorporated by reference herein in its entirety.

BACKGROUND OF THE INVENTION

1. Field of the Invention

The present invention relates to a probe assembly for lapping a bar, an apparatus for lapping a bar and a method for lapping a bar, and more particularly, to the structure of a probe assembly.

2. Description of the Conventional Art

When a bar that is provided with a plurality of elements to be formed into sliders is lapped in the process of manufacturing thin-film magnetic heads, it is significantly important to precisely control the amount in which a read element (MR element) is lapped. For this purpose, a technique is known in which a resistive film called an RLG (Resistance Lapping Guide) sensor is provided on a surface to be lapped of a bar and in which the bar is lapped while measuring electrical resistance of the resistive film via electrode pads connected to the resistive film and monitoring it by means of an external control apparatus. The RLG sensor and the electrode pads for measuring the electrical resistance are typically formed in a dicing zone of a bar.

As a method for connection with the electrode pad, a technique to bond a wire to the electrode pad is known. However, this method is disadvantageous in that the electrode pad may be damaged when a wire is attached to or removed from the pad or may be damaged through electrostatic discharge. In addition, operation to remove a wire takes time and may lead to a longer lead time. Furthermore, part of a wire may remain on a bar when it is removed, causing contamination of a slider.

Therefore, alternative methods for connection with the electrode pad other than the wire bonding have been studied. Japanese Patent Laid-Open Publication No. 2000-163719 discloses a technique to press a needle-shaped terminal against an electrode pad. Japanese Patent Laid-Open Publication No. 95572/90 discloses a technique to press a probe against an electrode pad from behind.

The technique described in Japanese Patent Laid-Open Publication No. 2000-163719 is disadvantageous in that the needle is easily bent because of axial force applied thereto and, consequently leading to difficulty in positioning the needle. The technique described in Japanese Patent Laid-Open Publication No. 95572/90 is disadvantageous in that it requires a large apparatus and resultantly, higher cost. This technique is also disadvantageous in that excessive pressing force is easily applied to the pad because the probe is pressed against the bar while it faces the bar, and precise position control is required.

SUMMARY OF THE INVENTION

In view of such disadvantages of the conventional art described above, it is an object of the present invention to provide a probe assembly with less influence on a bar, such as electrostatic discharge or contamination, which provides a shortened lead time and facilitates positioning of a probe with respect to an electrode pad. It is another object of the present invention to provide an apparatus for lapping a bar, as well as a method for lapping a bar using the same.

According to an embodiment of the present invention, a probe assembly used to lap a bar, the bar being provided with elements that are to be formed into sliders, is provided. The probe assembly comprises an elastically deflectable probe, and a stopper for applying bending deformation to the probe so as to cause first bending deflection at a leading end of the probe and for maintaining the first bending deflection of the leading end while preventing a bending deformation at the leading end from becoming smaller than the first bending deflection. The leading end of the probe is adapted to be subjected to second bending deflection that is larger than the first bending deflection in a same direction as a direction of the first bending deflection and thereby to abut against an electrode pad to establish electrical connection between the probe and the electrode pad, the electrode pad being provided on a surface of the bar other than a surface to be lapped.

According to a probe assembly thus adapted, the leading end of the probe can abut against the electrode pad by adjusting the bending deformation of the probe, i.e., the amount of the deflection of the leading end. Therefore, the probe does not come into contact with the electrode pad in such a manner that it is pressed against the electrode pad with axial force, as in the conventional art, and no excessive pressing force is exerted on the electrode pad. As a result, deformation and damage that the probe may suffer are minimized. In addition, the leading end of the probe is subjected to a first bending deflection in advance, and is then further subjected to bending deflection in the same direction as the first bending deflection to abut against the electrode pad. Accordingly, the area for which visual monitoring is required during the positioning operation is limited and a visual monitoring of the limited area can be performed with a large magnification factor, facilitating the positioning operation as well as reducing lead time. In addition, since the probe assembly has a simple structure comprised of a probe and a stopper, it is easy to prevent an increase in the size of the apparatus and an increase in cost. Furthermore, it is easy to prevent electrostatic discharge and contamination because of the arrangement that does not require wire bonding.

According to another embodiment of the present invention, an apparatus for lapping a bar comprises a probe assembly mentioned above, a rotatable lapping table adapted to lap the surface to be lapped of the bar by pressing the bar against the lapping table under rotation, a controller that is electrically connected to the conductive layer of the probe assembly, the controller being adapted to calculate an amount of lapping of the bar based on a signal supplied from the electrode pad of the bar, and a fixture for supporting the bar so that the surface to be lapped faces the lapping table.

According to yet another embodiment of the present invention, a method for lapping a bar is provided. The method comprises the steps of preparing a bar that is provided with elements to be formed into sliders, applying a first bending deflection to a leading end of a conductive layer of a probe, causing the probe to pivot in a direction same as a direction of the first bending deflection within a plane same as a plane in which the first bending deflection occurs, while maintaining the first bending deflection, disposing the pivoted probe adjacent to an electrode pad that corresponds to the probe in order to position the probe with respect to the electrode pad, wherein the electrode pad is provided on a surface of the bar that is other than the surface to be lapped, causing the probe to pivot in an inverse direction in order to cause the leading end of the probe to abut against the electrode pad of the bar and to cause second bending deflection at the leading end of the probe with an aid of pressing force applied from the electrode pad, and thereby establishing electrical connection between the probe and the electrode pad, the second bending deflection being in a direction same as a direction of the first bending deflection and being greater than the first bending deflection, and lapping the bar under an condition in which the electrical connection between the probe and the electrode pad is established, while calculating an amount of lapping of the bar based on a signal supplied from the electrode pad.

As described above, according to the present invention, it is possible to provide a probe assembly with less influence on a bar, such as electrostatic discharge or contamination, which provides a shortened lead time and facilitates positioning of a probe with respect to an electrode pad. Furthermore, according to the present invention, it is possible to provide an apparatus for lapping a bar, as well as a method for lapping a bar using the same The above and other objects, features and advantages of the present invention will become apparent from the following description with reference to the accompanying drawings which illustrate examples of the present invention.

DETAILED DESCRIPTION OF THE INVENTION

Figure 1:
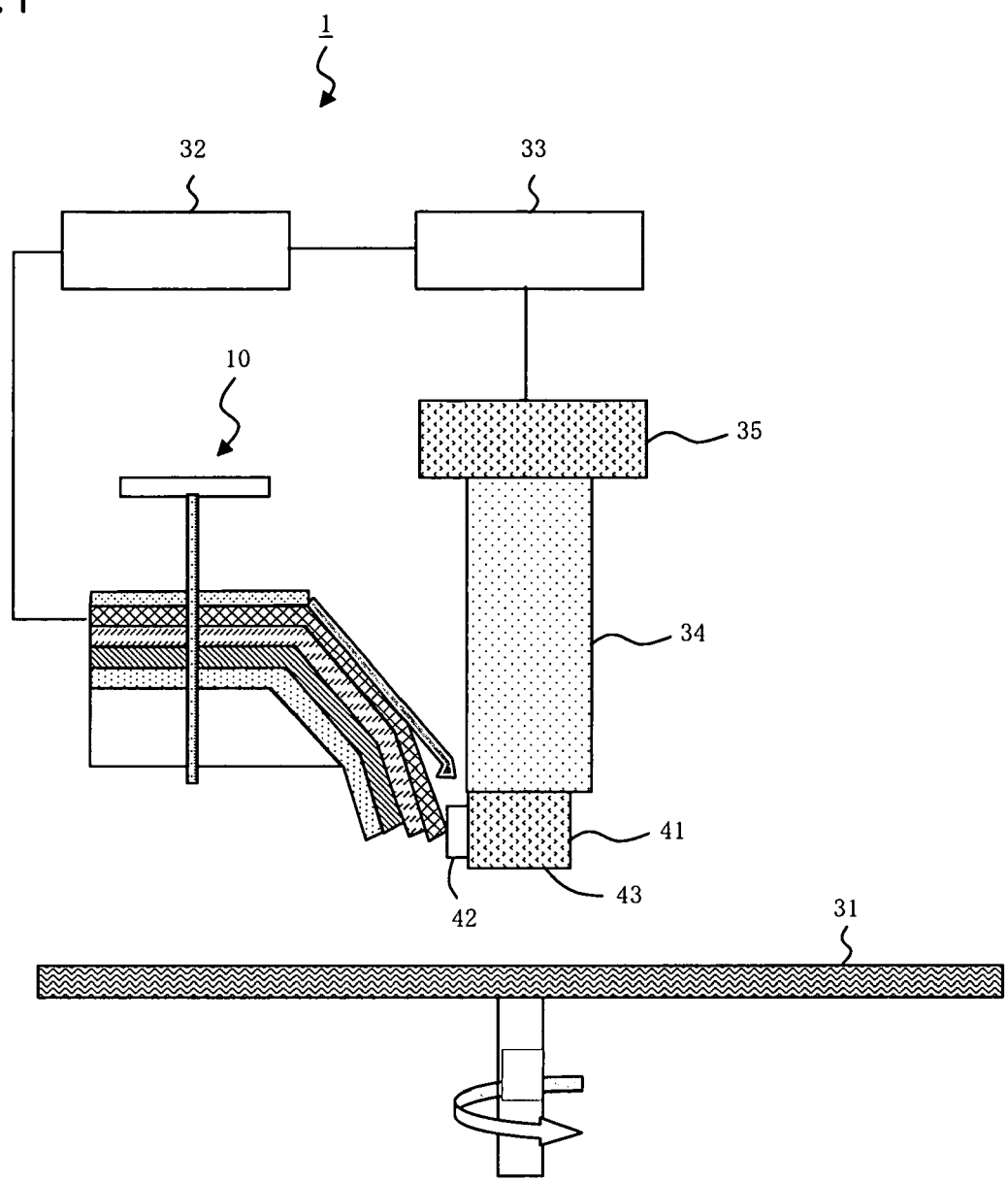
FIG. 1 is a schematic diagram of an apparatus for lapping a bar in accordance with an embodiment of the present invention.

A description of a probe assembly of the present invention and an apparatus for lapping a bar using the same will be made with reference to the accompanying drawings. FIG. 1 is a schematic diagram of an apparatus for lapping a bar in accordance with an embodiment of the present invention. Lapping apparatus 1 includes probe assembly 10, rotatable lapping table 31, control unit 33 electrically connected to probe assembly 10 via relay measurement circuit 32, and fixture 34 to support bar 41. Bar 41, also referred to as a row bar, can be mounted onto fixture 34 such that surface 43 to be lapped faces lapping table 31. Surface 43 of bar 41 is lapped by pressing bar 41 against rotating lapping table 31. In this specification, bar 41 is an elongate stack which is separated from a wafer by dicing and which is provided with a plurality of elements to be formed into sliders.

Bar 41 is provided with RLG sensors, not shown, that are formed on surface 43 and between the elements to be formed into sliders (typically in the dicing zones used to separate the bar into sliders). The resistive film is electrically connected to electrode pads 42, which are formed on a surface of the bar other than the surface to be lapped, via conductors formed in bar 41. When surface 43 is lapped, the resistive film is lapped simultaneously and the electrical resistance value thereof is gradually increased. The electrical resistance value is detected by control unit 33 via probe assembly 10 connected to electrode pad 42 and relay measurement circuit 32 connected to probe assembly 10. Since the relationship between the amount in which surface 43 is lapped and the electrical resistance value of the resistive film can be evaluated in advance, the amount of lapping can be calculated from the electrical resistance value. Load adjusting cylinder 35 is connected to fixture 34. Control unit 33 controls the force with which load adjusting cylinder 35 presses bar 41 against lapping table 31 based on the electrical resistance value that is detected. In this way, bar 41 is lapped with a desired amount of lapping.

Figure 2:
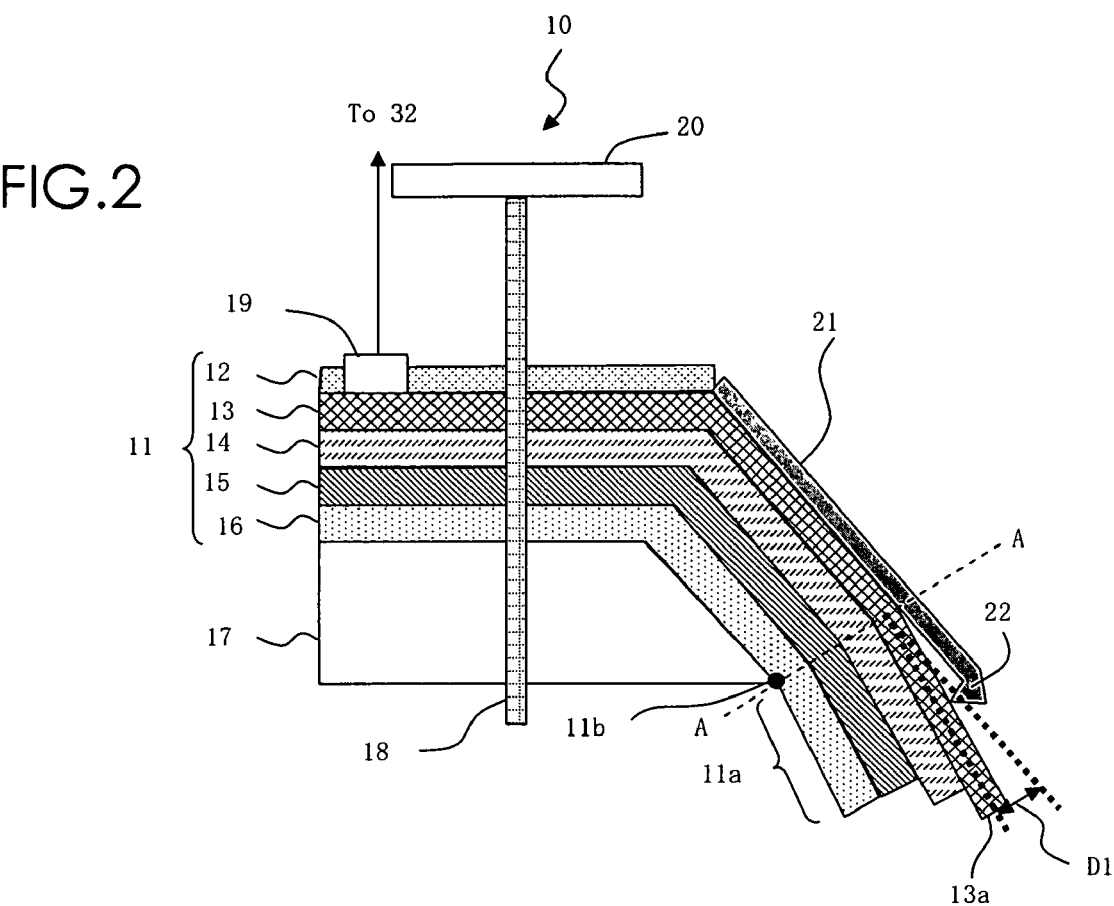
FIG. 2 is a side view of a probe assembly.
Figure 3:
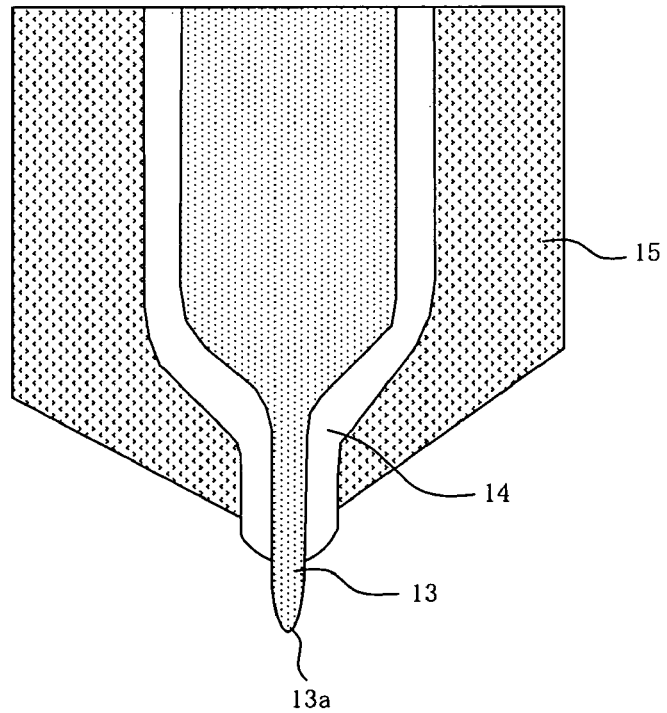
FIG. 3 is a front view of the leading end of the probe assembly (enlarged view of part A of FIG. 4)

Next, probe assembly 10 will be described in detail with reference to FIGS. 2 and 3. FIG. 2 is a side view of the probe assembly, and FIG. 3 is a front view of the leading end of the probe assembly (enlarged view of portion A of FIG. 4). Referring to FIG. 2, probe assembly 10 includes elastically deflectable probe 11 and stopper 21.

Probe 11 has a four-layer laminated body consisting of insulating cover 12, conductive layer 13, insulating layer 14 and elastic layer 15, which are stacked in this order from the top, and elastic reinforcement layer 16 attached to the laminated body. Conductive layer 13 is made of copper, and leading end 13*a* thereof protrudes more than other layers in order to allow conductive layer 13 to abut against electrode pad 42 at leading end 13*a*. The other end of conductive layer 13 is connected to relay measurement circuit 32 by wiring via connector 19 in order to allow a voltage signal supplied from electrode pad 42 to be transmitted to control unit 33 via relay measurement circuit 32. Conductive layer 13 thus constitutes the principal part of probe 11. Conductive layer 13 is formed by forming a thin film of copper on insulating layer 14 and then by etching the thin film. In this sense, probe 11 can be called a patterned probe.

Figure 4:
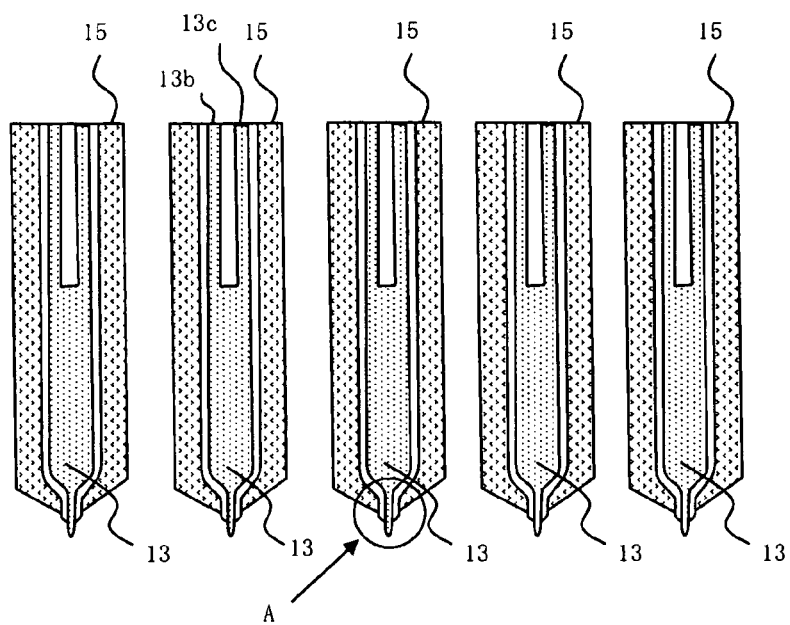
FIG. 4 is a front view of the probes.

Conductive layer 13 may be made of any conductive materials with excellent characteristics to follow bending deformation which can be formed into a desired shape by etching. It is therefore possible to use other metal, such as gold and silver, in addition to copper. Referring to FIG. 4, conductive layer 13 has branches 13*b*, 13*c* located away from leading end 13*a* so that the four-terminal method, in which one of the branches is used to apply current and the other is used to measure a voltage to measure the resistance value, is available. However, whether to provide branches or not depends on the types of the measuring methods, and a configuration of a conductive layer without branches is also possible.

Elastic layer 15 is made of stainless steel and serves to provide probe 11 with desired bending stiffness. As will be described later, probe 11 is subjected to bending deformation that causes first bending deflection D1 and second bending deflection D2 at leading end 13*a* of conductive layer 13, and elastic layer 15 serves to cause these bending deformations D1 and D2 as a result of elastic deformation of probe 11. Although conductive layer 13 has its own bending stiffness of a certain magnitude, the bending stiffness thereof is not enough to ensure sufficient bending stiffness because conductive layer 13 is usually formed as a thin film taking into consideration the conductive property and facilitation of patterning, as described above. Hence, by providing elastic layer 15, it is possible to provide probe 11 with desired bending stiffness with a high degree of freedom. Since repulsive force (elastic spring-back force) of probe 11 increases in accordance with an increase in the bending stiffness, probe 11 can firmly abut against electrode pad 42, as will be described later. The bending stiffness of probe 11 can be easily adjusted by simply changing the thickness or width of elastic layer 15. Elastic layer 15 can also contribute to a reinforcement of conductive layer 13, which does not have sufficient strength.

As described above, since elastic layer 15 is made of stainless steel, conductive layer 13 and elastic layer 15 need to be electrically isolated from each other. Hence, insulating layer 14 is provided between conductive layer 13 and elastic layer 15. Insulating layer 14 is made of an insulating material, such as polyimide or epoxy.

Elastic reinforcement layer 16 is provided on the back side of elastic layer 15 as viewed from conductive layer 13. Elastic reinforcement layer 16 is provided as a backup layer of elastic layer 15 because it may be difficult to ensure sufficient strength by elastic layer 15 alone. Specifically, reinforcement layer 16 may be provided in order to compensate insufficient bending stiffness is of probe 11. Reinforcement layer 16 may also be provided in order to continue measurement with certain magnitude of load even when the deformation characteristics of elastic layer 15 have been degraded. Similarly to elastic layer 15, elastic reinforcement layer 16 is made of stainless steel. The bending stiffness of probe 11 can be easily adjusted not only by changing the thickness or width of elastic layer 15 but also by changing the thickness or width of elastic reinforcement layer 16. Elastic reinforcement layer 16 can be provided optionally, and a configuration of a probe without an elastic reinforcement layer is also possible taking into consideration the required bending stiffness of the probe etc.

Insulating cover 12 is provided in order to protect conductive layer 13. Probe 11 is mounted on probe support 17 with conductive layer 13 facing upward. Conductive layer 13 is less apt to be damaged during handling due to insulating cover 12. It should be noted that insulating cover 12 mainly covers the portion of conductive layer 13 that is away from leading end 13a and that the portion of conductive layer 13 that is close to leading end 13a is covered with stopper 21, as will be described later. Connector 19 is provided penetrating through part of insulating cover 12 to allow the wire to connect conductive layer 13 with relay measurement circuit 32.

Probe 11 is supported by a support body called probe support 17. Probe support 17 supports at least part of probe 11. However, leading end 13a of conductive layer 13 is not supported by probe support 17 to allow leading end 13a to move freely with respect to probe support 17.

Figure 5:
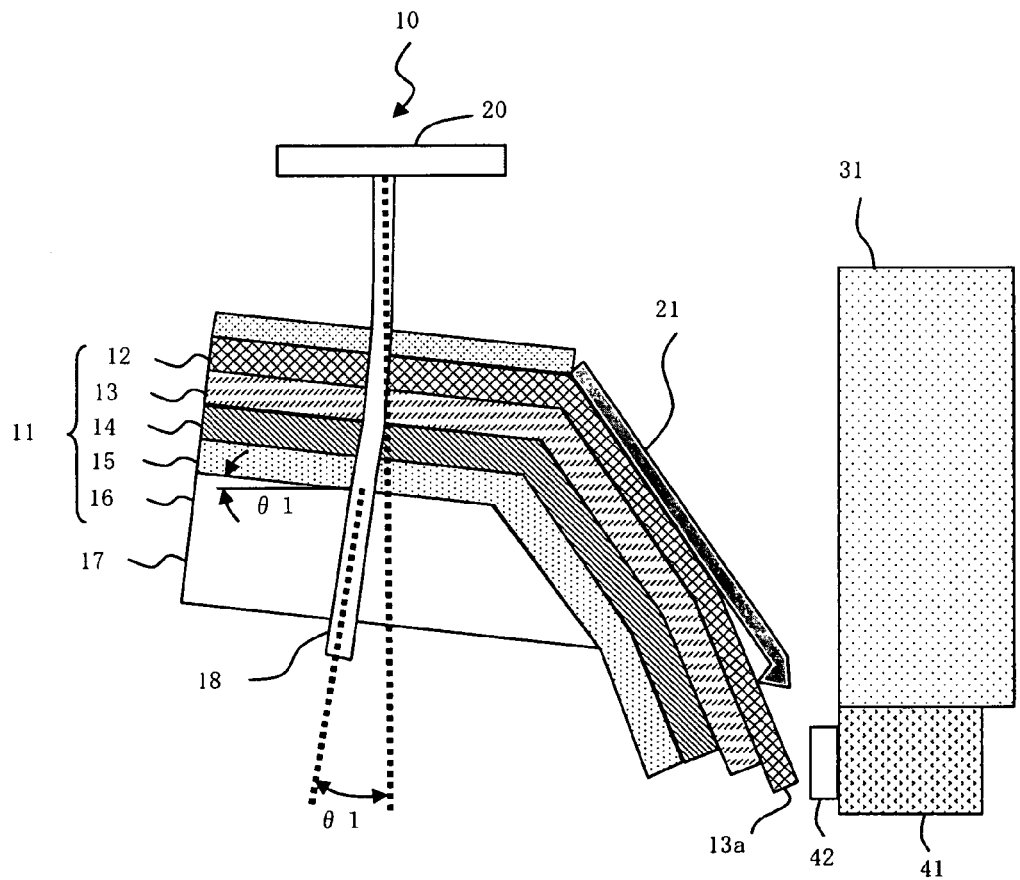
FIG. 5 is a schematic view that is similar to FIG. 2 illustrating a condition in which a probe assembly is positioned with respect to a bar.

Probe assembly 10 has blade spring 18 adapted to cause probe 11 to rotate in the same plane as the plane in which first and second bending deformations, which will be described later, occur. Blade spring 18, which may be made of any elastically deformable materials, is supported by probe support 17 and upper probe support 20. By applying bending deformation to blade spring 18 with upper probe support 20 being fixed, probe 11 moves as illustrated in FIG. 5. This movement can be substantially regarded as a pivotal movement and, therefore, the term "pivoting" or "pivotal movement" may be used in the following description. The bending deformation of blade spring 18 can be temporarily retained using, for example, a positioning pin, not shown.

Stopper 21 is supported by probe support 17 together with probe 11, but is a member that is independent of probe 11. Stopper 21 extends above conductive layer 12 generally along the shape of probe 11. Stopper 21 is provided with protruding portion 22 facing probe 11 at the leading end thereof. When protruding portion 22 abuts against probe 11, elastic deformation occurs in portion 11a of probe 11 that is located near leading end 13a and that is not supported by probe support 17. Specifically, probe 11 is subjected to bending deformation in the portion that is near leading end 13a and that is defined by axis A-A that passes through edge 11b, which is an edge of the portion supported by probe support 17, and extends perpendicular to layers 12 to 16 that constitute probe 11. The bending deflection at leading end 13a of probe 11 in this state is referred to as first bending deflection D1 in the following description. The magnitude of first bending deflection D1 depends on the size and shape of stopper 21 and on the positional relationship of stopper 21 with probe 11. However, since the repulsive force of probe 11 is supported by protruding portion 22, the bending deflection of leading end 13a is maintained not less than first bending deflection D1. It is possible that leading end 13a is deflected to exceed first bending deflection D1, but the bending deflection of leading end 13a of probe 11 is maintained at bending deflection D1 if no other bending moment is applied to probe 11.

FIG. 4 shows a front view of the probes. When a bar is lapped, the amount of lapping needs to be precisely controlled at positions along the length of the bar, and many RLG sensors are usually provided along the length of the bar for this purpose. Accordingly, many electrode pads 42 are provided along the length of the bar. These probes need to be simultaneously and electrically connected to these electrode pads. For this reason, probe 11 of the present embodiment is provided with a plurality of conductive layers 13 independent of each other, and each conductive layer is adapted to abut against each electrode pad. Also, a plurality of elastic layers 15 and a plurality of elastic reinforcement layers 16 that correspond to respective conductive layers 13 are provided (elastic reinforcement layer 16 is not shown). Because of the independency of each elastic layer 15, bending stiffness of each elastic layer 15 can be adjusted separately. Elastic layers 15 may be provided with different bending stiffness, for example, by changing the thickness or width of elastic layers 15. It is also possible to provide each elastic reinforcement layer 16 with individual bending stiffness in the same way as described above.

Figure 6:
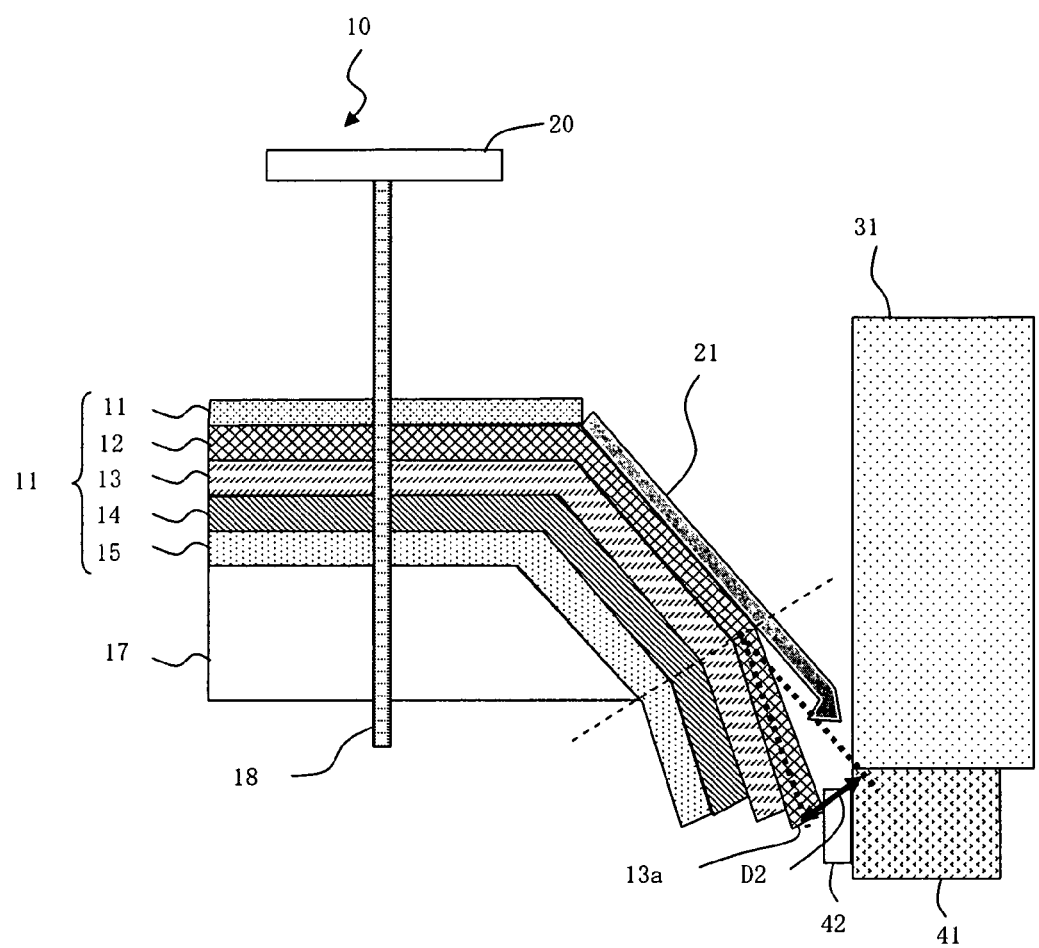
FIG. 6 is a schematic view that is similar to FIG. 2 illustrating a condition in which a probe assembly abuts against a bar.

FIG. 5 is a schematic view similar to FIG. 2 when a probe assembly is positioned with respect to a bar. FIG. 6 is a schematic view similar to FIG. 2 when the probe assembly abuts against the bar. A method for lapping a bar in accordance with the present invention will be described with reference to FIGS. 2, 5 and 6.

First, bar 41 that is provided with a plurality of elements to be formed into sliders is prepared.

Next, a probe assembly is prepared and put in the state illustrated in FIG. 2. Specifically, stopper 21 is attached to the probe assembly to apply bending moment to probe 11, thereby causing first bending deflection D1 at leading end 13a of conductive layer 13.

Next, probe 11 is caused to pivot in the same direction as first bending deflection D1 within the same plane as the plane in which first bending deflection D1 occurs, while maintaining first bending deflection D1. Specifically, as shown in FIG. 5, bending deformation is applied to blade spring 18 with upper probe support 20 being fixed, causing probe 11 to pivot by pivotal angle θ1. Due to this movement, leading end 13a of conductive layer 13 is shifted to the left as compared with FIG. 2. Stopper 21 pivots together with probe 11, and accordingly, the positional relationship between probe 11 and stopper 21 is maintained, and leading end 13a of conductive layer 13 remains subjected to first bending deflection D1 (see FIG. 2). The positional change of leading end 13a of conductive layer 13 is caused exclusively by the pivotal movement of probe 11 that results from the bending deformation of blade spring 18. The bending deformation of blade spring 18 is retained by appropriate means, such as the positioning pin mentioned above.

Next, probe 11 is disposed adjacent to electrode pad 42 that is provided on a surface other than surface to be lapped 43 of bar 41, in which elements to be formed into sliders are provided. In this step, probe 11 is also positioned with respect to corresponding electrode pad 42. This positioning operation is carried out by an operator under a magnified condition achieved by a microscope or the like. By providing blade spring 18 with appropriate bending deformation, it is possible to adjust pivotal angle θ1 of probe 11 so that there is a slight gap between leading end 13a of conductive layer 13 and electrode pad 42. Since leading end 13a of conductive layer 13 and electrode pad 42, which require visual monitoring by the operator, are located close to each other, it is possible to carry out the positioning operation under a further magnified condition.

Next, probe 11 is caused to pivot in an inverse direction (counterclockwise in the figure) to cause leading end 13a of probe 11 to abut against electrode pad 42 of bar 41. Specifically, blade spring 18 is disengaged from the positioning pin to release bending moment applied thereto, thereby returning to its initial position with elastic restorative force. By providing an appropriate gap between leading end 13a of conductive layer 13 and electrode pad 42 in the above-described positioning step, it is possible to cause leading end 13a of probe 11 to abut against electrode pad 42 of bar 41 and to cause second bending deflection D2, which occurs in the same direction as the direction in which first bending deflection D1 occurs and is greater than first bending deflection D1, at leading end 13a of probe 11 when blade spring 18 returns to its initial position. Probe 11 is disengaged from stopper 21 in this state. Second bending deflection D2 is only caused by pressing force applied from electrode pad 42, and no bending moment is applied from stopper 21.

Electrical connection between probe 11 and electrode pad 42 is assured by the elastic restorative force of probe 11 which causes second bending deflection D2. In this way, probe 11 is pressed against electrode pad 42 with appropriate force, and satisfactory contact between probe 11 and electrode pad 42 is maintained.

Next, in this state in which electrical connection between probe 11 and electrode pad 42 is established, bar 41 is lapped in accordance with the conventional art, while calculating the lapping amount of bar 41 based on the signal supplied from electrode pads 42.

As described above, in the present embodiment, leading end 13a of probe 11 is subjected to first bending deflection D1, and then the entire probe is pivoted in advance in the direction in which leading end 13a moves away from bar 41 or electrode pad 42. Consequently, bar 41 is set and probe 11 is pivoted inversely to bring probe 11 into contact with electrode pad 42 with second bending deflection D2. In this way, while the position of probe 11 is adjusted, probe 11 is placed in a deformation state that is close to the deformation state in which probe 11 is in contact with electrode pad 42. Accordingly, any objects other than leading end 13a of probe 11 after probe 11 is pivoted and electrode pad 42 do not need to be included in the field of view of a microscope, which may actually be a camera monitor. Thus, it is possible to visually monitor a small area by magnifying the area, and positioning operation is facilitated.

Finally, the advantages of the present embodiment will be summarized as follows.

First, a bar has a rugged surface and is actually warped when the bar is fixed onto a fixture. Therefore, a bar is pressed with forces of various magnitudes depending on the locations of the bar, leading to variation in contact resistance. Accordingly, the resistance value of the RLG sensors can not be precisely measured, and the amount of lapping can not be correctly controlled according to the conventional art disclosed in Japanese Patent Laid-Open Publications Nos. 2000-163719 and 95572/90. Whereas, the present invention provides a patterned probe configuration with separate probes to allows each probe to come into contact with a bar with appropriate force in accordance with irregularity in each portion of the bar. The pressing force applied from each probe to each electrode pad can be individually adjusted by individually adjusting the bending stiffness of each elastic layer and each elastic reinforcement layer, so that desired contact resistance can be easily obtained.

Furthermore, since probes abut against electrode pads with the aid of elastic restorative force in the present invention, pressing force of a certain magnitude can be advantageously ensured even if there is irregularity in the bar. Accordingly, in spite of the soft patterned probe, the leading end of the probe comes into contact with an electrode pad with appropriate pressing force. This force is sufficient for establishing electrical connection. The present method is also advantageous in that no axial force to cause a probe to abut against an electrode pad is applied, and therefore no excessive force is applied to the electrode pad and the probe, thereby reducing damage which the electrode pad and probe may suffer.

The present method is also advantageous over the conventional art in which wire bonding is used because of reduced possibility of electrostatic discharge, a shortened lead time, and reduced contamination.

As another advantage of the patterned probe, it should be noted that the probe is simple in structure and is easily manufactured with high precision and at low cost.

Furthermore, the elastic reinforcement layer (the backup layer) is provided below the three-layer probe structure made of copper, polyimide and stainless steel in the present invention. Therefore, even if the deformation characteristics of one or more probes, which constitute a probe array usually consisting of several tens of probes disposed along the bar, are changed, the change in the deformation characteristics can be compensated by the elastic reinforcement layer. Accordingly, there is no need to replace all of the probes. As a further advantage of the present invention, it should be appreciated that the elastic reinforcement layer is a structure that is independent of the three-layer probe structure, and therefore, it is possible to adjust pressing force applied to electrode pads by simply replacing the elastic reinforcement layers.

Although a certain preferred embodiment of the present invention has been shown and described in detail, it should be understood that various changes and modifications may be made without departing from the spirit or scope of the appended claims.

What is claimed is:

1. An apparatus for lapping a bar, said bar being provided with elements that are to be formed into sliders, comprising:
    a probe assembly comprising:
        an elastically deflectable probe; and
        a stopper for applying bending deformation to said probe so as to cause first bending deflection at a leading end of said probe and for maintaining said first bending deflection at said leading end while preventing a bending deformation at said leading end from becoming smaller than said first bending deflection;
        said leading end of said probe being configured to be subjected to a second bending deflection that is larger than said first bending deflection in a direction same as a direction of said first bending deflection and thereby to abut against an electrode pad to establish electrical connection between said probe and said electrode pad, said electrode pad being provided on a surface of said bar other than a surface to be lapped;
    a rotatable lapping table adapted to lap said surface to be lapped of said bar by pressing said bar against said lapping table under rotation;
    a controller that is electrically connected to said conductive layer of said probe assembly, said controller being adapted to calculate an amount of lapping of said bar based on a signal supplied from said electrode pad of said bar; and a fixture for supporting said bar so that said surface to be lapped faces said lapping table.

2. The apparatus according to claim 1, wherein said probe is a patterned probe in which a conductive layer adapted to abut against said electrode pad at said leading end and an elastic layer adapted to cause said first and second bending deflections are stacked.

3. The apparatus according to claim 2, further comprising a probe support adapted to at least partially support portions of said probe that are other than said leading end thereof, wherein said stopper includes a protruding portion to cause an elastic deformation in a portion of said probe that is near said leading end and that is not supported by said probe support, said elastic deformation causing said first bending deflection a leading end of said probe.

4. The apparatus according to claim 2, wherein said conductive layer has branches located away from said leading end.

5. The apparatus according to claim 2, wherein said conductive layer is formed by etching.

6. The apparatus according to claim 2, wherein said elastic layer is made of a conductor, and said probe includes an insulating layer between said conductive layer and said elastic layer, said insulating layer electrically isolating said conductive layer and said elastic layer from each other.

7. The apparatus according to claim 6, wherein said elastic layer is made of stainless steel, said insulating layer is made of polyimide, and said conductive layer is made of copper.

8. The apparatus according to claim 2, wherein said conductive layer is one of a plurality of conductive layers that the probe assembly is comprised of, and said plurality of conductive layers are provided independently of each other so that said conductive layers abut against a plurality of said electrode pads, respectively, and wherein said elastic layer is provided for each conductive layer.

9. The apparatus according to claim 8, wherein said elastic layer is one of a plurality of elastic layers that the probe assembly is comprised of, and said elastic layers differ from one another in terms of bending stiffness.

10. The apparatus according to claim 2, further including an elastic reinforcement layer on a back side of said elastic layer as viewed from said conductive layer.

11. The apparatus according to claim 10, wherein said conductive layer is one of a plurality of conductive layers that the probe assembly is comprised of, and said plurality of conductive layers are provided independently of each other so that said conductive layers abut against a plurality of said electrode pads, respectively, and wherein said elastic layer and said elastic reinforcement layer are provided for each conductive layer.

12. The apparatus according to claim 11, wherein said elastic reinforcement layer is one of a plurality of elastic reinforcement layers that the probe assembly is comprised of, and wherein said conductive layers differ from one another or said elastic reinforcement layers differ from one another in terms of bending stiffness.

13. The apparatus according to claim 1, further including a probe pivoting mechanism adapted to cause said probe to pivot in a plane same as a plane in which said first and second bending deflections occur.

14. A method for lapping a bar, the method comprising:
preparing a bar that is provided with elements to be formed into sliders;
applying a first bending deflection to a leading end of a conductive layer of a probe;
causing said probe to pivot in a direction same as a direction of said first bending deflection within a plane same as a plane in which said first bending deflection occurs, while maintaining said first bending deflection;
disposing the pivoted probe adjacent to an electrode pad that corresponds to said probe in order to position said probe with respect to said electrode pad, wherein said electrode pad is provided on a surface of said bar that is other than said surface to be lapped;
causing said probe to pivot in an inverse direction in order to cause said leading end of said probe to abut against said electrode pad of said bar and to cause second bending deflection at said leading end of said probe with an aid of pressing force applied from said electrode pad, and thereby establishing electrical connection between said probe and said electrode pad, said second bending deflection being in a direction same as a direction of the first bending deflection and being greater than the first bending deflection; and
lapping said bar under a condition in which said electrical connection between said probe and said electrode pad is established, while calculating an amount of lapping of said bar based on a signal supplied from said electrode pad.

* * * * *